(12) United States Patent
Vincent

(10) Patent No.: US 9,845,270 B2
(45) Date of Patent: Dec. 19, 2017

(54) CASTABLE REFRACTORY MATERIAL

(71) Applicant: Pyrotek Engineering Materials Limited, Milton Keynes (GB)

(72) Inventor: Mark Vincent, Milton Keynes (GB)

(73) Assignee: PYROTEK ENGINEERING MATERIALS LIMITED, Milton Keynes (GB)

( * ) Notice: Subject to any disclaimer, the term of this patent is extended or adjusted under 35 U.S.C. 154(b) by 0 days.

(21) Appl. No.: 15/117,684

(22) PCT Filed: Mar. 27, 2015

(86) PCT No.: PCT/GB2015/050929
§ 371 (c)(1),
(2) Date: Aug. 9, 2016

(87) PCT Pub. No.: WO2015/162398
PCT Pub. Date: Oct. 29, 2015

(65) Prior Publication Data
US 2017/0029341 A1     Feb. 2, 2017

(30) Foreign Application Priority Data

Apr. 25, 2014   (GB) .................................. 1407343.1

(51) Int. Cl.
*B22C 1/18*     (2006.01)
*B22C 1/06*     (2006.01)
(Continued)

(52) U.S. Cl.
CPC .............. *C04B 35/803* (2013.01); *B22C 1/06* (2013.01); *B22C 1/183* (2013.01); *B22C 9/126* (2013.01); *B22D 15/04* (2013.01); *B22D 21/007* (2013.01); *B22D 41/02* (2013.01); *B28B 1/007* (2013.01); *B28B 11/243* (2013.01); *C04B 28/24* (2013.01); *C04B 35/14* (2013.01); *C04B 35/66* (2013.01); *C04B 2111/00431* (2013.01); *C04B 2235/3418* (2013.01); *C04B 2235/5228* (2013.01); *C04B 2235/5232* (2013.01);
(Continued)

(58) Field of Classification Search
CPC .... B22C 1/00; B22C 1/06; B22C 1/18; B22C 1/183
USPC .................................................. 164/516–529
See application file for complete search history.

(56) References Cited

U.S. PATENT DOCUMENTS 4,174,331 A    11/1979  Myles
5,147,830 A     9/1992  Banerjee et al.
(Continued)

FOREIGN PATENT DOCUMENTS

EP    0434421 A2    6/1991
GB    1203206 A     8/1970
(Continued)

OTHER PUBLICATIONS

Combined Search and Examination Report under Sections 17 & 18(3) in Great Britain Patent Application No. 1407343.1, dated Apr. 25, 2016.

*Primary Examiner* — Kevin E Yoon
(74) *Attorney, Agent, or Firm* — Knobbe Martens Olson & Bear LLP

(57) ABSTRACT

A castable refractory material for use in the manufacture of refractory products including fused silica, ceramic fiber, microsilica and a bonding material comprising colloidal silica.

19 Claims, 6 Drawing Sheets

(51) Int. Cl.
- *C04B 35/80* (2006.01)
- *B22D 41/02* (2006.01)
- *C04B 28/24* (2006.01)
- *C04B 35/14* (2006.01)
- *C04B 35/66* (2006.01)
- *B22C 9/12* (2006.01)
- *B22D 15/04* (2006.01)
- *B22D 21/00* (2006.01)
- *B28B 1/00* (2006.01)
- *B28B 11/24* (2006.01)
- *C04B 111/00* (2006.01)

(52) U.S. Cl.
CPC ............. *C04B 2235/5436* (2013.01); *C04B 2235/5454* (2013.01); *C04B 2235/602* (2013.01); *C04B 2235/612* (2013.01); *C04B 2235/9676* (2013.01); *Y02W 30/94* (2015.05)

(56) References Cited

U.S. PATENT DOCUMENTS

| | | |
|---|---|---|
| 5,360,773 A | 11/1994 | Winkelbauer et al. |
| 5,494,267 A | 2/1996 | Anderson et al. |
| 5,603,759 A | 2/1997 | Burkhart |
| 5,880,046 A | 3/1999 | Delvaux et al. |
| 8,087,450 B2 * | 1/2012 | Nycz ............... B22C 1/183 164/361 |
| 2005/0199366 A1 | 9/2005 | Vandermeer et al. |
| 2011/0114279 A1 | 5/2011 | Scott |
| 2012/0148736 A1 | 6/2012 | Bhattacharja |

FOREIGN PATENT DOCUMENTS

| | | |
|---|---|---|
| WO | WO 99/31027 A1 | 6/1999 |
| WO | WO 00/47532 A | 8/2000 |
| WO | WO 02/038308 A | 5/2002 |
| WO | WO 02/100571 A1 | 12/2002 |
| WO | WO 2015/162398 A1 | 10/2015 |

\* cited by examiner

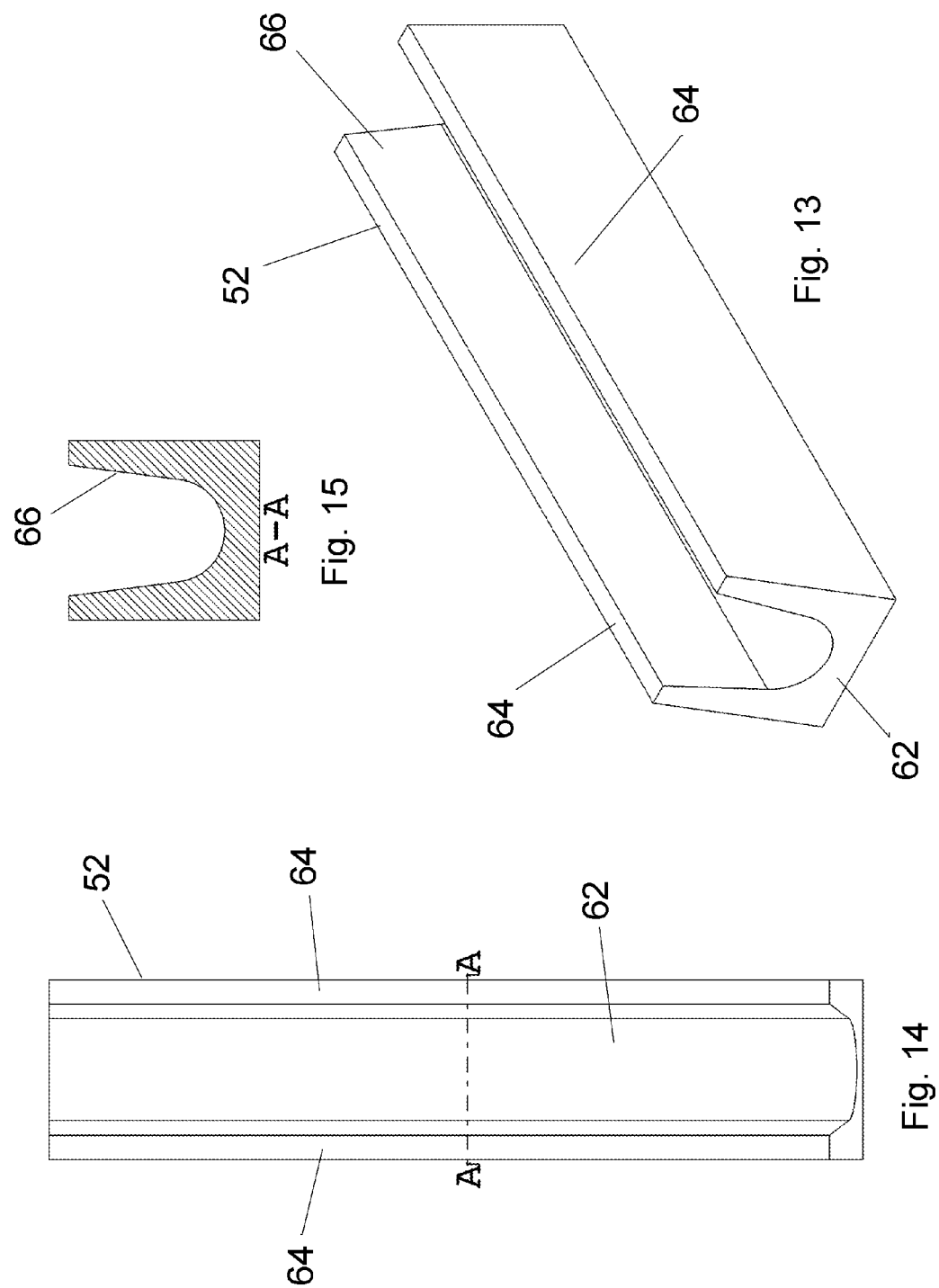

CASTABLE REFRACTORY MATERIAL

RELATED APPLICATIONS

This application is the U.S. National Phase filing under 35 U.S.C. §371 of PCT/GB2015/050929, filed Mar. 27, 2015, which designated the United States and was published in English as WO 2015/162398 on Oct. 29, 2015, which claims priority under 35 U.S.C. §119(a)-(d) to Great Britain Patent Application No. 1407343.1, filed Apr. 25, 2014, the entire content of which is incorporated herein by reference.

FIELD OF THE INVENTION

The present invention relates to a castable refractory material for use in the manufacture of refractory products to be used in aluminium production and refining processes. In particular the invention relates to a castable refractory material for use in the manufacture of refractory products that come into direct contact with molten aluminium and alloys thereof. The invention also relates to a process for manufacturing refractory products from the castable refractory material, and to refractory products made wholly or partly from that material.

The castable refractory material may for example be used to make components of a direct chill (DC) casting system. These components may include a trough, a down-spout, a cross-feeder or a thimble. It should be understood however that the refractory material is also suitable for the manufacture of other refractory products used within the molten aluminium producing industry.

BACKGROUND OF THE INVENTION

Direct chill (DC) casting is a vertical semi-continuous casting process used for the fabrication of cylindrical billets from non-ferrous metals such as aluminium and alloys thereof. A DC metal casting apparatus is described for example in U.S. Pat. No. 4,598,763.

A DC casting system typically includes a plurality of water-cooled moulds, each having an open-ended vertical passageway through which the liquid metal flows. As the molten metal passes through the water-cooled moulds it is cooled causing the peripheral region of the metal to freeze. The mould is usually quite short (typically 75-150 mm) and as the metal emerges from the lower end of the mould it is further cooled by water jets causing the remainder of the metal to freeze, thereby forming a cylindrical billet. The lower end of the billet is supported by a starting head (or dummy block), which is lowered gradually (typically at a rate of 50-150 mm/min) by a hydraulic ram. Liquid metal is supplied continuously to the mould until the hydraulic ram reaches its bottom position. Typically, billets produced by the DC process have a diameter of 50-500 mm with a length of 4-8 meters.

A DC casting system normally has a plurality of moulds, typically allowing 2-140 billets to be formed simultaneously. The moulds are supported by a steel casting table and are fed with molten metal through a metal distribution system. There are two principle designs of DC casting system: in the first design the flow of metal is controlled by a float and in the second design the metal flows into the mould through a feeding device made of a refractory material. This second design is often called a "hot-top" casting system.

In a typical hot-top casting system the metal distribution system includes a plurality of refractory feeding devices called "cross-feeders" that contain the liquid metal and distribute it to the moulds as the billets are formed. The cross-feeders are supported on a steel casting table and distribute the liquid metal to a plurality of casting sites beneath the table. Additional refractory components are provided beneath the table to guide the flow of liquid aluminium from the cross-feeder to the casting sites. These refractory components typically include a cylindrical sleeve (called a "thimble" or "scupper") that fits into the circular feed hole of the cross-feeder, a circular transition plate (also called a T-plate or "top ring") that extends radially outwards from the lower end of the thimble, and a tubular cylindrical graphite casting ring (or "casting mould") that extends downwards from the outer periphery of the transition plate. These components may for example be as described in U.S. Pat. No. 4,598,763.

In a conventional DC casting system the refractory components may be made from different refractory materials, according to their individual requirements. For example, the thimble is usually made from a relatively dense and strong refractory material, so that it has good resistance to erosion from the molten aluminium that flows through it. Typically, for example, the thimble may be made from a cement-bonded fused silica refractory, examples of which are manufactured by Pyrotek Inc. and Rex Materials Group Limited. This material typically has a density of approximately 2 g/cm$^3$.

An example of a formula for a conventional thimble and other metal contact refractories using fused silica bonded with cement is set out below.

| Material | % |
|---|---|
| Fused Silica | 80% |
| Non-wetting additive | 5% |
| Cement | 5% |
| Water | 10% |
| Total | 100% |

Typically, in a conventional DC casting system, a thimble will operate for about 500 casts and the calcium silicate transition plate will operate for 250 to 350 casts.

SUMMARY OF THE INVENTION

Other refractory materials designed for use in aluminium processing are known, including non-castable fibre-based ceramic refractories, which are formed into a product by compression moulding but cannot be cast by pouring into a mould.

It is an object of the present invention to provide a castable refractory material for use in the manufacture of refractory products, as well as products made from that material, that mitigates one or more of the aforesaid problems, or that provides advantages over existing refractory materials and products. Further objects of the present invention are to provide a refractory product for use in aluminium processing and a method of making a refractory product.

According to one aspect of the invention there is provided a castable refractory material for use in the manufacture of refractory products (including in particular refractory products used in aluminium processing), wherein the castable refractory material includes fused silica, ceramic fibre, microsilica and a bonding material comprising colloidal silica.

The castable refractory material is strong and has good resistance to erosion from liquid aluminium and aluminium alloys, good thermal shock resistance, low thermal conductivity and good dimensional stability. It is castable, thus simplifying the production of refractory products in a range of different shapes. It can also be machined, allowing products to be made to very fine tolerances. The ceramic fibre contained within the material plays an important role in dispersing thermal and mechanical stresses within the cast product, thereby increasing the strength and thermal shock resistance of the product. The term "ceramic fibre" as used herein is intended to include both crystalline ceramic fibres and amorphous ceramic fibres (vitreous or glass fibres). The ceramic fibre may for example be an alkaline earth silicate fibre or an alumino silicate fibre.

The three forms of silica (fused silica, microsilica and colloidal silica) contained within the castable refractory material ensure a near ideal packing density, thereby increasing the strength of the cast product. The fused silica generally comprises a range of particle sizes, for example from 3.5 μm to 150 μm, or for some products up to 6 mm. The microsilica generally has a smaller particle size, for example less than 1 μm, and the particles are approximately spherical. This ensuring good packing density, provides a large surface area for a good bond strength, and helps the material to flow thereby reducing the water demand. The colloidal silica comprises nanoparticles of silica, for example between 1 and 100 nanometers in size, which fill the interstices between the larger particles and provide great bond strength in the fired product.

Advantageously, the castable refractory material comprises fused silica in the range 30-90%, preferably 40-70% by weight.

Advantageously, the castable refractory material comprises ceramic fibre in the range 5-45%, preferably 10-42% by weight.

Advantageously, the castable refractory material comprises microsilica in the range 2-15%, preferably 8-10% by weight.

Advantageously, the castable refractory material comprises colloidal silica in the range 3-25%, preferably 12-20% by weight.

Advantageously, the fused silica includes particle sizes in the range 150 μm to 3.5 μm. For some applications the fused silica may also include larger particles, for example having a size up to 6 mm.

Advantageously, the fused silica includes particles of mesh size 200 and particles of mesh size 325. The inclusion of very small particles of mesh sizes 200 and 350 ensures a near ideal packing density, thereby increasing the strength of the cast product.

Advantageously, the ceramic fibre is a synthetic refractory ceramic fibre, which is preferably stable up to a temperature of at least 1200 C.

Advantageously, the ceramic fibre is an alkaline earth silicate fibre.

Advantageously, the ceramic fibre is soluble (non-durable) in physiological fluids, for example lung fluid. This helps to reduce or avoid the health risks associated with the use of non-soluble fibres, which can cause lung disease if inhaled.

Advantageously, the ceramic fibre is a chopped (or "milled") fibre having a fibre length in the range 9-15 μm.

Advantageously, the castable refractory material includes a dispersing agent, for example a polyacrylate dispersant.

Advantageously, the castable refractory material includes a non-wetting agent in the range 0%-12% by weight. The non-wetting agent (or anti-corrosion additive) preferably comprises Barium Sulphate and/or Calcium Fluoride. Other non-wetting agents may also be used, for example Magnesium Fluoride. The non-wetting agent helps to protect the cast refractory product from attack by the molten aluminium.

According to another aspect of the invention there is provided a refractory product for use in aluminium processing, comprising a refractory material according to any one of the preceding statements of invention.

Advantageously, the refractory product comprises a component of a direct chill (DC) casting system, preferably a trough, a down-spout, a cross-feeder or a thimble.

Advantageously, the refractory product has a density in the range 0.8-2.0 g/cm$^3$, preferably 1.2-1.8 g/cm$^3$, more preferably 1.3-1.7 g/cm$^3$.

According to another aspect of the invention there is provided a method of making a refractory product for use in aluminium processing, said method comprising providing a refractory material according to any one of the preceding statements of invention, casting the refractory material in a mould, and firing the cast product.

Advantageously, the method further comprises machining the cast product.

Advantageously, the method further comprises casting the refractory material using a freeze casting process.

Advantageously, the method further comprises drying the cast product prior to firing.

According to a preferred embodiment of the invention there is provided a castable refractory material for use in the manufacture of refractory products, which includes fused silica, preferably having a particle size in the range 150 μm to 3.5 μm, ceramic fibre preferably in the form of chopped fibre, microsilica (e.g. Elkem 971U), and colloidal silica as a bonding material (e.g. Nalco 1140 grade). The use of a dispersing agent for example BUDITH 4 h (Budenheim) and a pH stabilising additive such as citric acid is also preferred. Optionally, the castable refractory material may also include a non-wetting agent (or anti-corrosion additive), preferably Barium Sulphate and/or Calcium Fluoride.

The mould is manufactured from materials having good thermal conductivity such as aluminium. The mould design is important. The product is preferably produced using negative temperature, i.e. freeze casting techniques. Therefore it is advantageous to design the moulds so that energy transfer between the positive temperature of the mixed refractory material and the negative atmospheric temperature environment of the freezer are as efficient as possible. After freezing the moulded part is removed from the mould. It is then typically placed into a drying oven set between 40 C and 140 C depending upon the design and mass of the part. After drying the product is ready to be fired to an elevated temperature in the kiln. Depending upon the product's final required properties this temperature can range from 700 C to 1550 C.

Finally, if required, the cast product can be machined to the required shape. It is an important requirement of many components that they have consistent dimensions. It is therefore important that the material is capable of being machined on a lathe to the dimensional accuracy required by the technology. Typically machining is carried out on a CNC lathe so each part produced has repeatable accuracy. The cast product machines very well and to a very high accuracy owing to the use of carefully selected particle sizes within the refractory material. For products that do not need to be manufactured to very tight tolerances it may be unnecessary to machine the cast product.

The castable refractory material may be used in the manufacture of various refractory products used in the aluminium production and refining industries, including, for example, the thimble, cross-feeder, trough or downspout used in a DC casting system. The cast aluminium billets can have an improved surface finish. The refractory material preferably has a density of approximately 1.5 g/cm$^3$. The density of the material can be varied by adjusting the ratios of the different components.

Other advantages of the material are that it does not shrink during use and it is unaffected by oil. The material can also be machined to very fine tolerances, for example plus or minus 0.05 mm.

Certain embodiments of the invention will now be described by way of example with reference to the accompanying drawings, wherein:

BRIEF DESCRIPTION OF THE DRAWINGS

FIG. 13 is an isometric view of a trough;

FIG. 14 is a plan view of the trough; and

FIG. 15 is a cross-section on line A-A of FIG. 14.

DETAILED DESCRIPTION OF THE PREFERRED EMBODIMENT

Figure 1:
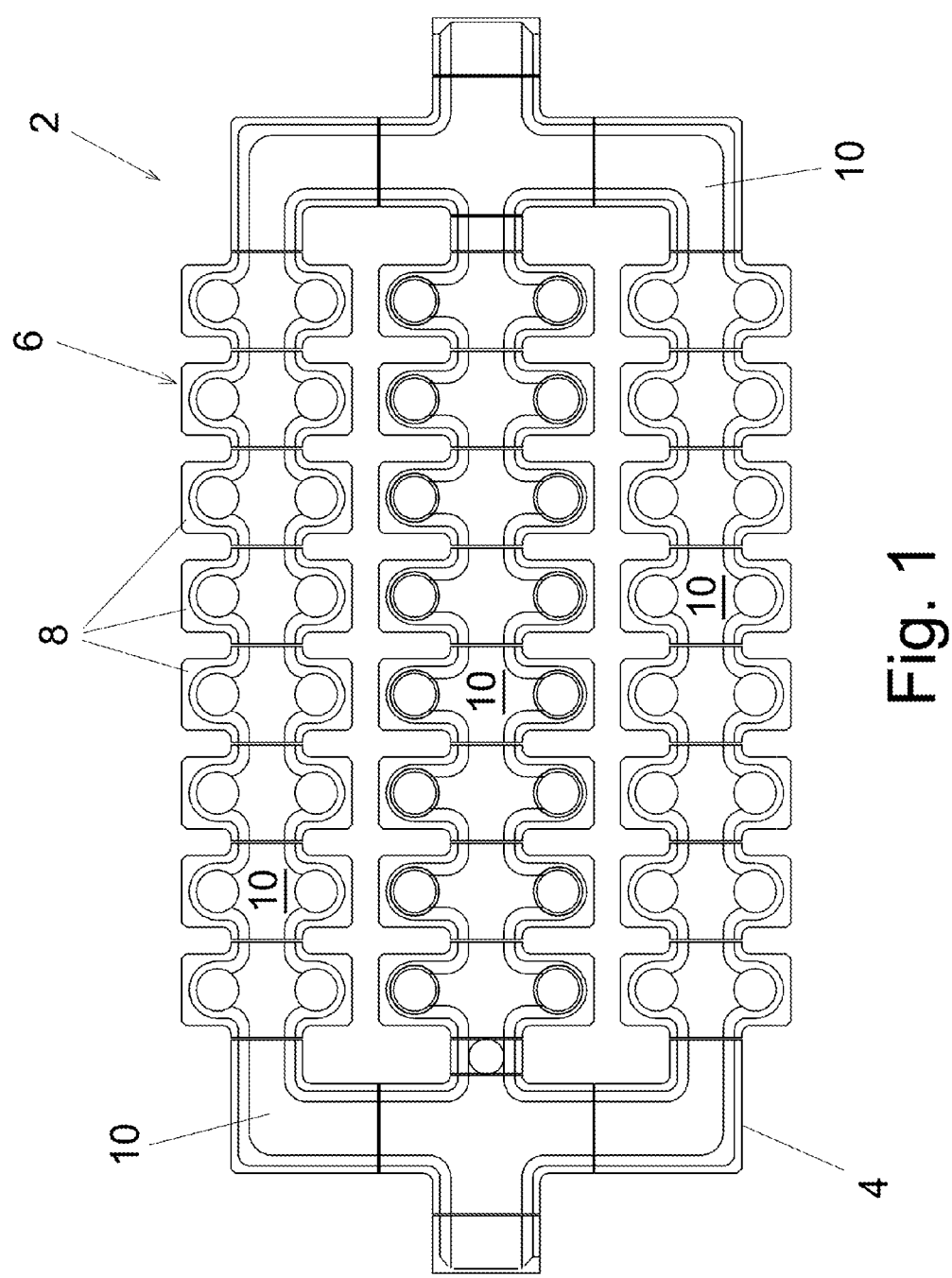
FIG. 1 is a plan view of a casting table for a DC casting system.

The casting table 2 shown in FIG. 1 comprises a rectangular steel support table 4 and a distributor system 6 comprising a plurality of refractory distribution devices 8 for containing and distributing liquid metal to a plurality of casting sites beneath the table 4. This particular casting table 2 is suitable for use in a direct chill (DC) casting system for fabricating cylindrical billets from non-ferrous metals such as aluminium and alloys thereof.

Figure 10:
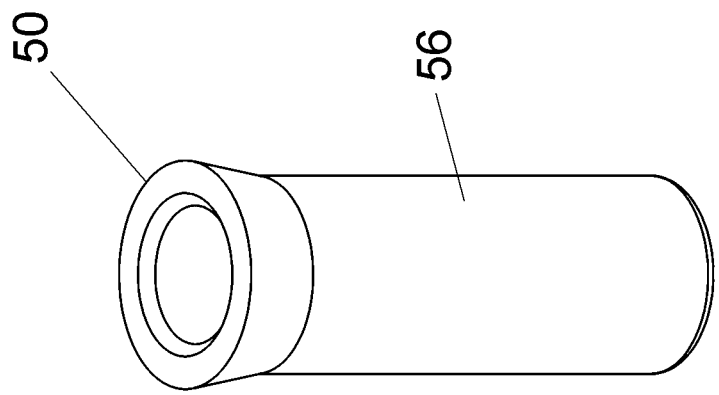
FIG. 10 is an isometric view of a down-spout.
Figure 11:
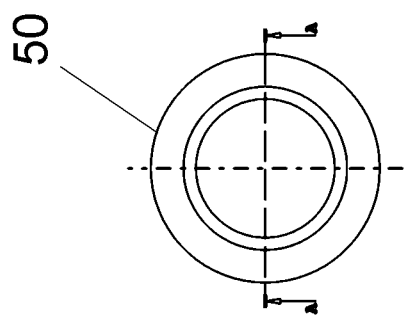
FIG. 11 is a plan view of the down-spout.
Figure 12:
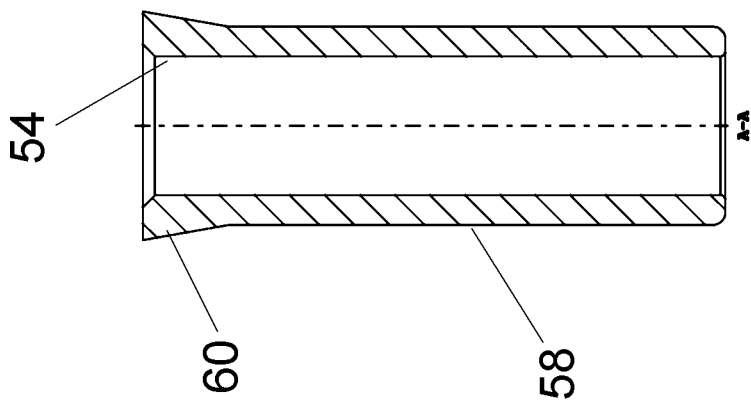
FIG. 12 is a cross-section on line A-A of FIG. 11.

The present invention relates to refractory products used in aluminium processing and is distributor systems including but not limited to DC casting systems of the type shown in FIG. 1. These refractory products include such products as the distribution device 8 shown in FIGS. 1-6, the thimble 40 shown in FIGS. 7-9, the down-spout 50 shown in FIGS. 10-12 and the trough 52 shown in FIGS. 13-15, as well as other refractory products that may be used in aluminium processing and distributor systems. The present invention also relates to a castable refractory material for use in the manufacture of refractory products, and a method of making refractory products.

A distribution device 8 according to one embodiment of the invention is shown in FIGS. 3-6. The distribution device 8 includes a refractory body 9, which is made of a cast refractory ceramic material and includes a base 12 and a peripheral wall 14 that extends upwards from the base 12.

The base 12 and the peripheral wall 14 together define one section of the open-topped trough 10. The peripheral wall 14, which may be continuous or discontinuous, comprises two short end walls 16 and two longer side walls 18. Each side wall 18 includes a central section 20 and two ends sections 22. The innermost parts of the end sections 22 curve outwards and the central section 20 thus stands out beyond the plane of the end sections 22. A U-shaped channel 24 is formed in the central section 20, which extends downwards from the top edge of the peripheral wall 14 through approximately two thirds of the height of the distribution device.

When a plurality of distribution devices 8 are mounted together on a casting table as shown in FIG. 1 the central section 20 of each side wall 18 abuts the central section of the side wall of an adjacent distribution device and the U-shaped channels 24 formed in the adjacent walls are aligned with one another forming the open-topped trough 10 that allows liquid metal to flow between the distribution devices 8.

Figure 2:
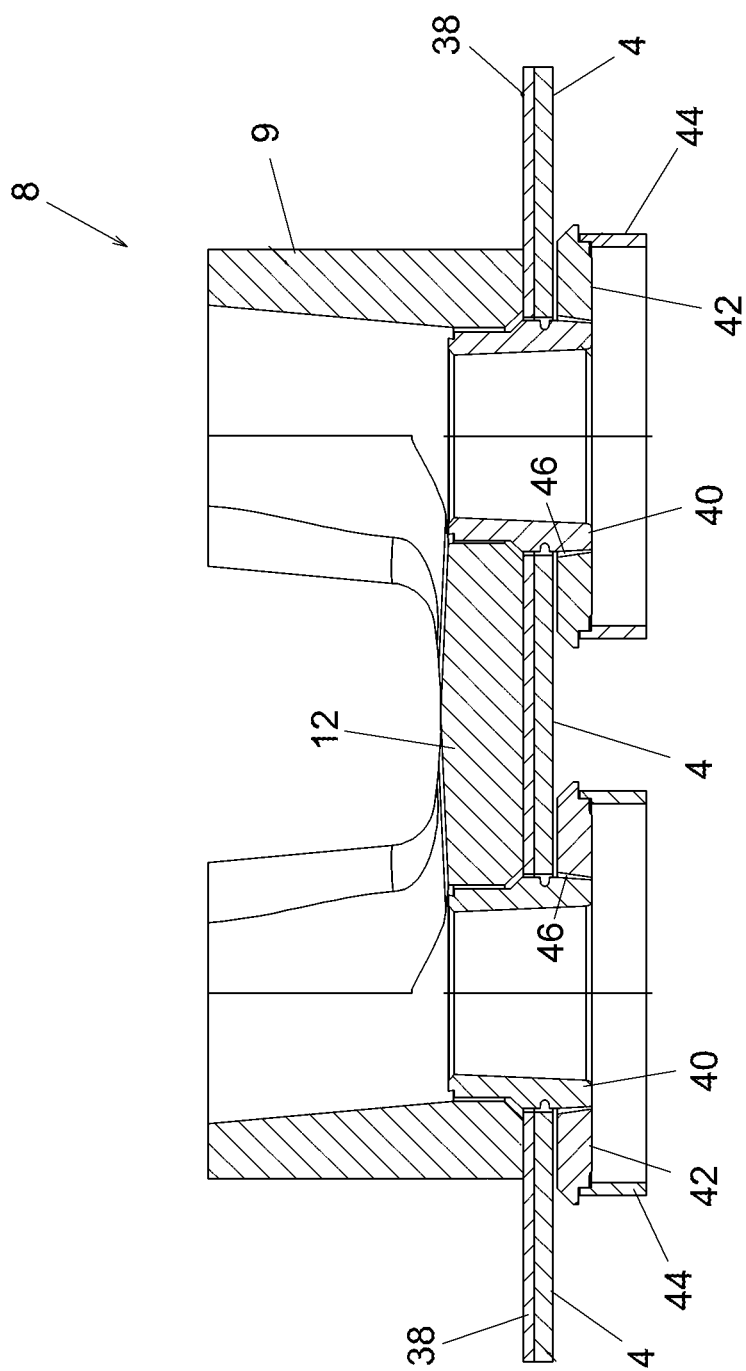
FIG. 2 is a sectional view of a casting table assembly including a distribution device and other refractory components.
Figure 3:
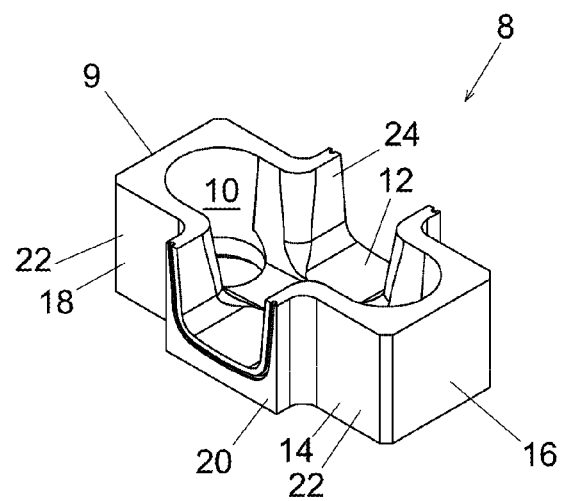
FIG. 3 is an isometric view of a distribution device.
Figure 4:
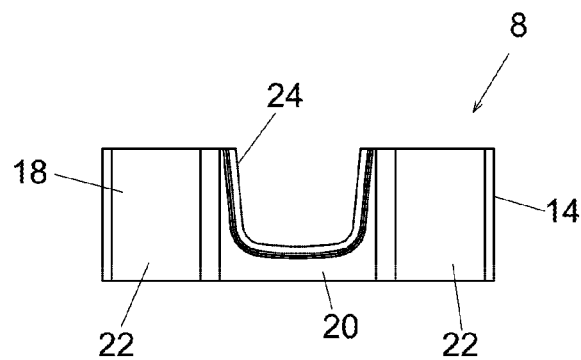
FIG. 4 is a side view of the distribution device.
Figure 5:
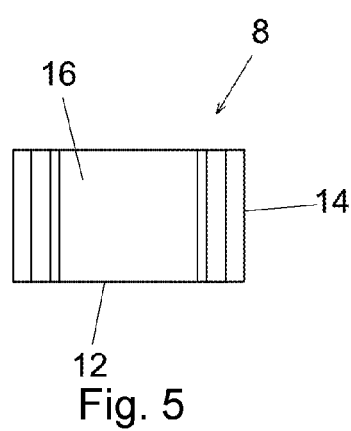
FIG. 5 is an end view of the distribution device.
Figure 6:
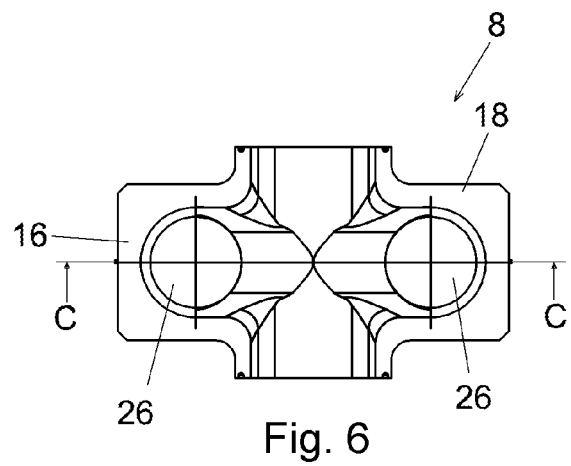
FIG. 6 is a plan view showing the upper side of the distribution device.

Two circular feed holes 26 are provided in the base 12 of the refractory body 9. In use, liquid metal can flow through these holes 26 to the casting sites defined by the table 2, so as to form billets. Although in this example the distribution device 8 has two feed holes 26, it may alternatively have more or fewer than two feed holes. The distribution device 8 is mounted on the support table 4 as shown in FIG. 2. A sheet of ceramic paper 38 is positioned between the distribution device 8 and the upper surface of the support table 4.

Additional refractory components of the casting system are provided to guide the flow of liquid aluminium from the distribution device 8 through the table 4 during formation of a billet. These refractory components may include for example a cylindrical sleeve (called a "thimble" or "scupper") 40 that fits within the circular feed hole 26 and extends through the base of the refractory body 9 and the thickness of the table 4, a circular transition plate (or "T-plate" or "top ring") 42 that extends radially outwards from the lower end of the thimble 40 below the lower surface of the table 4, and a tubular cylindrical graphite casting ring (or "casting mould") 44 that extends downwards from the outer periphery of the transition plate 42. A gasket may be provided within the cylindrical joint 46 between the cylindrical thimble 40 and the transition plate 42 to prevent liquid metal leaking through the joint.

Figure 8:
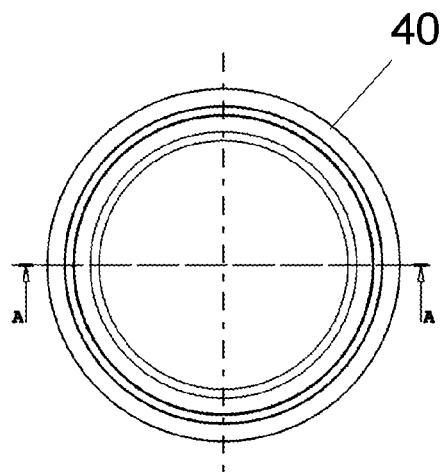
FIG. 8 is a plan view of the thimble device.
Figure 9:
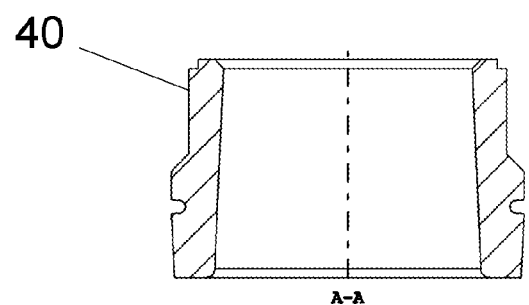
FIG. 9 is a cross-section on line A-A of FIG. 8.
Figure 7:
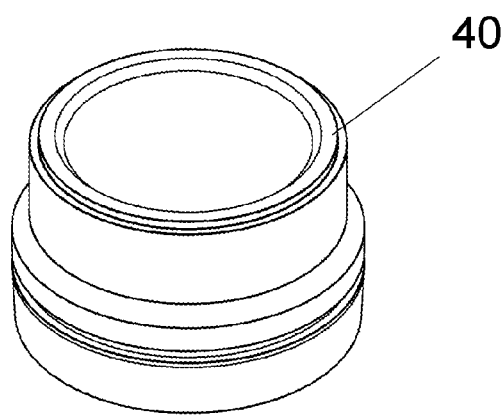
FIG. 7 is an isometric view of a thimble device.

The thimble 40 is shown in more detail in FIGS. 7-9. The shape of this refractory component may be conventional, for example as described in U.S. Pat. No. 4,598,763.

In an embodiment of the invention a refractory product, for example a distributor device 8 or a cylindrical thimble 40, is made from a new ceramic refractory composition that provides significant advantages over the refractory materials conventionally used for these components. An exemplary formulation suitable for manufacture of the thimble 40 is set out below.

| Material | Description | % by weight |
|---|---|---|
| Fused silica | 200 mesh | 37.80% |
| Fused Silica | 325 mesh | 10.10% |
| Micro-Silica | 971u | 10.00% |
| Fibre | None RCF | 26.00% |
| Dispex | Dispersing Agent | 0.10% |
| Colloidal Silica | Bond | 16.00% |
| | | 100.00% |

In this example a soluble ceramic fibre material is used (this type of material is also sometimes referred to as a "non-refractory ceramic fibre"). Specifically, in this example the ceramic fibre material is Insulfrax® chopped fibre material from Unifrax Ltd. This is an alkaline earth silicate wool, which has high temperature stability up to 1200 C, low thermal conductivity and excellent wet forming characteristics. It is soluble (non-durable) in physiological fluids, for example lung fluid. This helps to reduce or avoid the health risks associated with the use of non-soluble fibres, which can cause lung disease if inhaled. Alternatively, a non-soluble refractory ceramic fibre may be used, for example Fiberfrax® from Unifrax Ltd, which is an alumino silicate wool fibre.

The refractory composition also includes fused silica (a fully dense amorphous or non-crystalline form of silicon dioxide $SiO_2$). The fused silica is provided in crushed form and in the example set out above it is supplied in two mesh sizes: 200 mesh (<75 μm) and 325 mesh (<44 μm). Different distributions of particle size may be used depending on the product to be manufactured from the refractory composition. In general, if the product to be manufactured from the refractory material is dimensionally relatively small, or if it must be manufactured to tight tolerances, or if the cast product is to be machined after casting (as in the case of a thimble), relatively small particles of fused silica will be used (e.g. 200 mesh and 325 mesh). On the other hand, if the product to be manufactured is dimensionally relatively large, or if it is not required to be manufactured to tight tolerances, or if the cast product does not need to be machined after casting, relatively large particles of fused silica can be used. For example, a trough that does not need to be machined may include fused silica with a range of particle sizes such as 4/10 mesh, 10/20 mesh, 20/50 mesh, 50/100 mesh, 200 mesh and 325 mesh.

The refractory composition also includes microsilica (also called silica fume, which is an amorphous spherical form of silicon dioxide $SiO_2$, comprising an ultrafine powder consisting of particles smaller than 1 μm and having an average particle diameter of 150 nm). The microsilica is used in undensified form, having a bulk density of about 250-350 $kg/m^3$. For example, in the above embodiment the microsilica comprises grade 971u from Elkem AS. The refractory composition also includes colloidal silica (a suspension of amorphous silica particles in water, with particle sizes typically in the range 3 to 100 nm). In the example above we use Nalco 1140 from Nalco Chemical Company, which has a particle size of 15 nm and a silica content of 40%.

The refractory composition also includes a dispersing agent. In this embodiment we use a polyacrylate dispersing agent (Dispex® from BASF).

The above materials are mixed and the refractory mixture is then introduced into a mould. The mould is vibrated as the mixture is introduced to help the mixture flow easily throughout the mould.

The product is preferably moulded using a freeze casting technique. After freezing, the moulded part is removed from the mould and placed in a drying oven set at a temperature between 40 C and 140 C, according to the design and mass of the part. After drying, the product is fired in a kiln, typically at a temperature in the range 700 C to 1550 C.

Finally, if required, the cast product can be machined to the required shape/dimensions. Typically machining is carried out on a CNC lathe so each part produced has repeatable accuracy. The cast product machines very well and to a very high accuracy, particularly if the fused silica has a small particle size (e.g. 200 mesh and smaller). However, for products that do not need to be manufactured to very tight tolerances, it may be possible to achieve the required accuracy through the casting process: it may then be unnecessary to machine the components. In that case, larger particles of fused silica may be included, for example with a particle size up to 6 mm.

The cylindrical thimble 40 and/or other refractory components can be made from the new ceramic refractory composition described above, which in this embodiment includes fused silica, preferably having a particle size in the range 150 μm to 3.5 μm, non-refractory ceramic fibre (non RC fibre), preferably in the form of milled fibre, microsilica (e.g. Elkem 971U), and colloidal silica as a bonding material (e.g. Nalco 1140 grade). In this embodiment the material also includes a polyacrylate dispersing agent (for example Dispex® from BASF).

More generally the new ceramic refractory composition includes components in the following ranges (by weight):
Fused silica: 30-90%, preferably 40-60%
Microsilica: 2-15%, preferably 8-10%
Ceramic fibre: 5-45%, preferably 10-40%
Colloidal silica: 3-25%, preferably 12-20%

The ceramic fibre is preferably soluble (non-durable) in physiological fluids (this type of fibre is sometimes called a "non-refractory ceramic fibre"): for example it may be an alkaline earth silicate fibre. However it may alternatively be a non-soluble refractory ceramic fibre, for example an alumino silicate wool fibre.

In tests we have found that cylindrical thimbles made from this new refractory material are capable of producing more than 800 casts without failing. By comparison, thimbles made of a conventional cement-bonded fused silica refractory as described above will generally only operate for about 500 casts.

The distribution device 8 can be manufactured from the same family of raw materials as stated, i.e. fused silica, microsilica, non-RCF fibre, dispersing agent and colloidal silica. However the actual grades of fused silica can change depending upon the product design and needs. All products made from this family of materials are typically freeze cast.

Optionally, the refractory composition can if required include non-wetting additive (or anti-corrosion additive) such as Barium Sulphate and/or Calcium Fluoride. For example, we have used Barium Sulphate and Calcium Fluoride, both introduced at 3.5 wt % of the final body.

The new refractory material described herein may also be useful for other components that come into contact with liquid aluminium in an aluminium production or refining process, including for example a down-spout 50 and a transfer trough 52, examples of such products being shown in FIGS. 10-12 and 13-15 respectively. The down-spout 50 consists of a substantially cylindrical tube with an axial bore 54 and an external wall 56 with a cylindrical lower portion 58 and a flared upper portion 60. The down-spout 50 is of conventional shape and is used for transferring liquid metal from a trough into a mould.

The transfer trough 52 shown in FIGS. 13-15 comprises a base 62 and two parallel side walls 64, which together define an open-topped trough 66 for directing a flow of liquid metal. The trough is of conventional shape and may be made by a casting process using the new refractory material described herein.

What is claimed is:
1. A castable refractory material for use in the manufacture of refractory products, wherein the castable refractory material includes fused silica, ceramic fiber, microsilica and a bonding material comprising colloidal silica, wherein the castable refractory material comprises microsilica in a range of 2-15%, by weight.

2. The castable refractory material according to claim 1, comprising fused silica in a range of 30-90% by weight.

3. The castable refractory material according to claim 1, comprising ceramic fiber in a range of 5-45% by weight.

4. The castable refractory material according to claim 1, comprising colloidal silica in a range of 3-25%, by weight.

5. The castable refractory material according to claim 1, wherein the fused silica includes particle sizes in a range of 150 μm to 3.5 μm.

6. The castable refractory material according to claim 5, wherein the fused silica includes particles of mesh size 200 and particles of mesh size 325.

7. The castable refractory material according claim 1, wherein the ceramic fiber is a synthetic ceramic fibre.

8. The castable refractory material according to claim 1, wherein the ceramic fiber is an alkaline earth silicate fibre.

9. The castable refractory material according to claim 1, wherein the ceramic fiber is soluble in physiological fluids.

10. The castable refractory material according to claim 1, wherein the ceramic fiber is a chopped fibre having a fibre length in a range of 9-15 μm.

11. The castable refractory material according to claim 1, further comprising a dispersing agent.

12. The castable refractory material according to claim 1, further comprising a non-wetting agent in a range of 0%-12% by weight.

13. A refractory product for use in aluminium processing, comprising a cast refractory material according to claim 1.

14. The refractory product according to claim 13, further comprising a component of a direct chill (DC) casting system.

15. The refractory product according to claim 13, wherein the product has a density in a range of 0.8-2.0 g/cm$^3$.

16. A method of making a refractory product for use in aluminium processing, said method comprising providing a refractory material according to claim 1, casting the refractory material in a mold, and firing the cast product.

17. The method according to claim 16, further comprising machining the cast product.

18. The method according to claim 16, wherein the refractory material is casted using a freeze casting process.

19. The method according to claim 16, further comprising drying the cast product prior to firing.

* * * * *